April 25, 1944.   F. WHITWORTH   2,347,586
RELIEF MEANS FOR PRESSURE REGULATORS
Filed Nov. 28, 1941
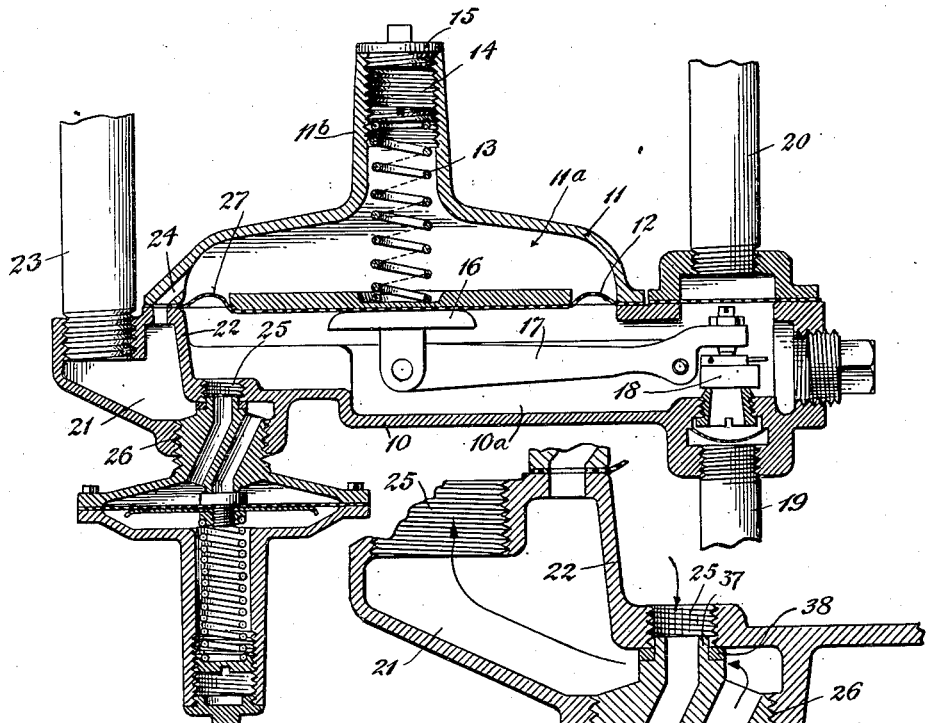
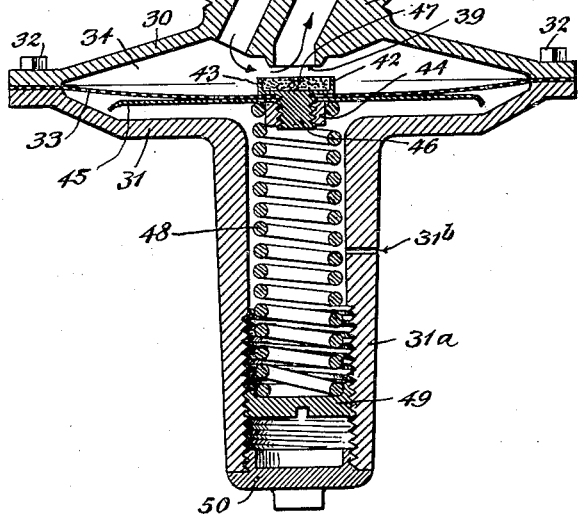
INVENTOR
Fairchild Whitworth,
BY
ATTORNEYS Patented Apr. 25, 1944

2,347,586

UNITED STATES PATENT OFFICE 2,347,586

RELIEF MEANS FOR PRESSURE REGULATORS

Fairchild Whitworth, Fairfield, Conn., assignor to Sprague Meter Company, Bridgeport, Conn., a corporation of Connecticut Application November 28, 1941, Serial No. 420,806

10 Claims. (Cl. 137—53)

The present invention relates to gas pressure regulators, and, more particularly, to improvements in relief valves for use therewith.

Gas pressure regulators usually are provided with a pressure chamber and an exhaust chamber therefor which is connected to the atmosphere. The cap chamber of the pressure regulator formed by the diaphragm is also connected to the exhaust chamber by a bleeder passage so that the diaphragm can act quickly upon a "blow off." A liquid seal is disposed between the pressure chamber and the exhaust chamber and through which gas under excess pressure may escape from the pressure chamber to the exhaust chamber and to the atmosphere.

These liquid seals have been objectionable because of the danger of the liquid being blown off when the pressure is relieved and also because of the failure of the seal should the gas pressure regulator with the liquid seal be turned into a position in which the liquid is ineffective to seal the connection. These conditions have required many calls to service the regulator and require constant checking of the regulator to insure that the proper amount of mercury is in the cup.

In addition to these mechanical difficulties, the price of mercury, which is the only liquid available for these seals, has risen rapidly to a point where the use of these seals has become costly.

Attempts have been made to avoid the use of these seals by replacing them with mechanical relief valves. However, this has presented new difficulties, especially in substituting them in existing regulators, since it requires a considerable amount of piping and cannot be arranged so as to connect the pressure chamber to the exhaust chamber.

These and other disadvantages and difficulties have been overcome by the present invention wherein a mechanical seal is provided between the pressure and exhaust chambers so as to directly connect these chambers upon an abnormal pressure in the pressure chamber to permit the gas to escape therefrom to the exhaust chamber. This is accomplished in the form of the invention shown herein, as exemplary thereof, by a self-contained unit which includes inlet and outlet passages passing through the neck thereof and communicating with the pressure chamber and exhaust chamber so as to reverse the flow of the gas therethrough and conduct it from the pressure chamber through the unit and back to the exhaust chamber without the need of any additional piping.

The unit of the present invention has a movable diaphragm and valve operated thereby for controlling the passages, the diaphragm being operated in response to the pressure in the pressure chamber.

An important feature of the present invention is the simplicity of construction, reliability in use, ease of installation and its efficiency in operation.

An advantageous feature of the invention is the arrangement whereby the unit may be inserted into existing pressure regulators in place of the liquid seal now in use therein, without any additional piping or structural modification of these existing regulators and with an increase in efficiency in their operation.

A further feature of the invention is that the mechanical seal will operate properly in all positions in which the pressure regulator may be mounted.

Other features and advantages of the invention will be apparent from the specification and claims when considered in connection with the drawing, in which:

Figure 1 shows a longitudinal sectional view of a pressure regulator with the mechanical seal in position thereon.

Fig. 2 is an enlarged detailed sectional view of the mechanical seal unit.

As shown in Fig. 1, the gas pressure regulator is of the usual type comprising a lower portion 10, and a cap portion 11 having a diaphragm 12 clamped between them and together with said portions forming a pressure chamber 10a and an upper or cap chamber 11a.

The diaphragm is normally loaded by a spring 13, the pressure of which may be adjusted by an adjusting member 14 threaded in a tubular boss 11b. The opening at the end of the boss, through which the adjustment is made, is closed by a cap 15 threaded therein. The diaphragm has a bracket 16 thereon to which a lever 17 is connected for controlling the valve 18 and thus regulating the flow of fluid from the intake 19 in accordance with the pressure in the pressure chamber so that the fluid is delivered through the outlet 20 at the desired pressure.

The lower portion of the casing is provided with an integral extension forming an exhaust chamber 21 separated from the pressure chamber by a wall 22. The exhaust chamber is connected to a vent pipe 23, and the cap chamber is also connected to the exhaust chamber by a breather passage 24 which enables the diaphragm to operate quickly upon variations of pressure in the pressure chamber.

The wall 22 is provided with a tube-receiving aperture 25, and the exterior wall of the lower casing below the aperture 25 is formed with a threaded cup-receiving opening 26 into which the usual liquid-receiving cup is threaded to cooperate with a tube carried by the aperture 25 to form the liquid seal for the pressure chamber.

The mechanical seal of the present invention is secured to the pressure regulator by having a part thereof threaded into the cup-receiving aperture and connecting with the tube-receiving aperture, so as to provide a controlled connection between the pressure chamber and the exhaust chamber.

In the preferred form of the invention, the mechanical sealing unit comprises a casing formed of a body portion 30 and a cap portion 31 having their edges bolted together by bolts 32. A flexible diaphragm 33 is clamped between the edges and, together with the body portion and cap portion, forms a body chamber 34 and a spring chamber 35 within the casing.

Centrally located on and projecting from the body portion is a threaded neck or plug 36, to be screwed into the cup-receiving opening 26. The plug has a central portion of reduced diameter projecting from the outer end thereof to form a nipple 37 which extends into the tube-receiving aperture 25 in the wall.

When the unit is in position, a packing ring 38 surrounding the nipple and bearing against the end of the plug is clamped against the wall 22 and seals the connection therebetween so that the only communication between the pressure chamber and exhaust chamber will be through the mechanical sealing unit.

The inner end of the plug extends into the body chamber and is provided with a central annular projection adapted to form a valve seat 39 as will be explained.

The novel passage arrangement in the unit of the present invention comprises an inlet passage 40 and an outlet passage 41 both formed in the neck or plug so as to completely reverse the flow of fluid through the unit.

As will be noted in Fig. 2, the intake passage 40 starts in the nipple and extends axially of the plug for a short distance and then turns at a slight angle to the axis of the plug and opens into the body chamber adjacent the valve seat 39 so as to connect the body chamber to the pressure chamber.

The outlet passage 41 starts within the valve seat and extends back through the plug axially thereof for a short distance and then diverges at an angle to the axis of the plug and opens at the other end of the plug into the exhaust chamber and connects the body chamber to the exhaust chamber and completes the connection between the pressure chamber and the exhaust chamber.

In order to control the fluid through this connection, the present invention employs a valve 42 carried by the diaphragm 33 to cooperate with the valve seat 39 to close said passageways.

The valve comprises a cup-shaped member 43 having a threaded neck 44 extending therefrom and through a central aperture in the diaphragm and a metal backing disk 45 therefor and clamped in position by a nut 46 threaded on the neck. The cup-shaped portion of the member is filled with a suitable packing member or composition 47 which, when the valve is pressed into engagement with the valve seat, will completely and effectively seal the outlet passage.

The valve is urged into engagement with the seat by means of a spring 48 having one end engaging the back of the plate 45 and its other end bearing against an adjustable abutment 49 threaded into a boss 31a formed on the cap member 31. The open end of the boss through which a tool is inserted to engage a kerf in the adjustable abutment to adjust the abutment so as to regulate the pressure at which the diaphragm will operate is closed by a cap 50. The spring chamber may be vented, if desired, by an aperture 31b in order to permit the diaphragm to move freely.

It will be noted that the body chamber and the pressure chamber are interconnected so that the body chamber will have the same pressure therein as the pressure chamber. Upon an abnormal increase in pressure in the pressure chamber, the pressure in the body chamber will build up and act on the diaphragm to cause it to overcome the action of the spring and carry the valve away from the valve seat thus connecting the pressure chamber to the exhaust chamber through the outlet passage so as to relieve this excess pressure. When the unit is in this condition, the flow of fluid will follow the course of the arrows, shown in Fig. 2, and will pass through the aperture 25 in the wall 22 along the intake passage 40 to the body chamber 34 through the opening in the valve seat 39 to the outlet passage 41 and into the exhaust chamber 21 and in the exhaust pipe 23.

As soon as the pressure in the pressure chamber and connected body chamber has been relieved, the spring 48 will move the valve to close the outlet passage. This will insure that the pressure chamber will be sealed from the exhaust chamber until another "blow off" occurs. The pressure at which the "blow off" takes place can be regulated by proper adjustment of abutment 49.

Since the seal does not depend upon the liquid level in the cup returning to a predetermined position, as in prior devices, it will always seat itself after each blow off.

The diaphragm carried valve will act in any position of the unit and will seal the opening 25 in all positions to which the pressure regulator may be turned.

In its broader aspects, the mechanical sealing unit of the present invention may be used as a relief valve which will completely reverse the flow of fluid and return it to a point adjacent its intake.

Variations and modifications may be made within the scope of this invention, and portions of the improvements may be used without others.

I claim:

1. In combination with a device provided with a pressure chamber and an exhaust chamber separated by a wall having an opening therein, of a mechanical seal for said opening for controlling the connection between said chambers comprising a body portion having a part thereof extending through the exhaust chamber and closing the opening in the separating wall; a movable diaphragm connected to and extending across the body portion and with it forming a body chamber, said part of the body portion having an inlet passage communicating with the opening in the wall and connecting the pressure chamber to the body chamber and an outlet passage connecting the body chamber to the exhaust chamber; and means for urging the diaphragm to close the outlet passage, said means yielding upon an abnormal pressure in the pressure chamber and connected body chamber to open the outlet passage thereby connecting the pressure chamber to the exhaust chamber.

2. In combination with a device provided with a pressure chamber and an exhaust chamber separated by a wall having an opening therein, of a mechanical seal for said opening for controlling the connection between said chambers comprising a body portion having a part thereof extending through the exhaust chamber and closing the opening in the separator wall; a movable diaphragm connected to and extending across the body portion and with it forming a body chamber, said part of the body portion having an inlet passage connecting the pressure chamber to the body chamber and an outlet passage completely reversing the flow of fluid and connecting the body chamber to the exhaust chamber; and means including a diaphragm controlled by the pressure in said body chamber for closing the outlet passage.

3. In combination with a device provided with a pressure chamber and an exhaust chamber separated by a wall having an opening therein, of a mechanical seal for said opening for controlling the connection between said chambers comprising a body portion having a part thereof extending through the exhaust chamber and closing the opening in the separator wall; a movable diaphragm connected to and extending across the body portion and with it forming a body chamber, said part of the body portion having a pair of substantially parallel passages, one communicating with the opening in the wall and connecting the pressure chamber to the body chamber and the other connecting the body chamber to the exhaust chamber and completely reversing the direction of flow of fluid therethrough; and means for urging the diaphragm to close the outlet passage, said diaphragm moving under an abnormal pressure in the pressure chamber and connected body chamber to open the outlet passage thereby connecting the pressure chamber to the exhaust chamber.

4. A mechanical seal for a device having a pressure chamber and a separate exhaust chamber having a threaded neck comprising a casing formed of a body portion and cover portion secured together; a flexible diaphragm disposed between the body and cover portion and with them forming a body chamber and cover chamber, the body portion having a plug thereon threaded into the neck and having a part thereof connecting with the aperture in the wall in the pressure chamber, said plug having an inlet passage extending therethrough from the aperture to the body chamber and connecting the pressure chamber thereto, and an outlet passage connecting the body chamber with the exhaust chamber, the diaphragm having a valve therein; and means for normally urging the valve to close the outlet passage and seal said pressure chamber, said means yielding to open the outlet passage upon an abnormal pressure in the pressure chamber and interconnected body chamber and to again close upon relief of said abnormal pressure.

5. A mechanical seal to be threaded into an opening in a device having a pressure chamber and a separate exhaust chamber to control a fluid connection between the said pressure and exhaust chambers thereof, comprising a casing formed by a body and a cover portion, a flexible diaphragm clamped between the body and cover portions and dividing the casing into a body chamber and cover chamber, the body portion being provided with a plug threaded into the opening and having a part thereof in communication with the pressure chamber and another part thereof in communication with the exhaust chamber, said plug having an inlet passage from the pressure chamber to the body chamber and an outlet passage from the body chamber to the exhaust chamber; and means for urging the diaphragm to close the outlet passage, said means yielding upon an abnormal pressure in the pressure chamber and body chamber connected thereto to open the outlet passage and connect the pressure chamber to the exhaust chamber.

6. A relief valve for connecting and controlling the fluid flow between a pair of chambers separated by a wall having an opening therein comprising a casing formed of a body portion and a cover portion secured together, a flexible fluid pressure operated diaphragm disposed between the body and cover portions and with them forming a body chamber and cover chamber, the body portion having a threaded plug thereon for mounting the valve on one of said pair of chambers with the end of the plug overlying and in sealing relation with the opening in the wall, said plug having a passage extending therethrough from the opening in the wall to the body chamber to connect one of said pair of chambers thereto and another passage extending from the body chamber to the other of said pair of chambers, the flexible diaphragm having a valve thereon to engage and close the inner end of one of the passages; and means for urging the valve carried by the diaphragm to closed position, and yielding upon a predetermined pressure in one of said connected chambers to open the passage therebetween.

7. A relief valve for connecting and controlling the fluid flow between a pair of chambers separated by a wall having an opening therein comprising a casing formed of a body portion and a cover portion secured together, a flexible fluid pressure operated diaphragm disposed between the body and cover portions and with them forming a body chamber and cover chamber, a threaded plug integral with the body portion for mounting the valve on one of said pair of chambers and having a projecting portion extending into the opening and sealing the same, said plug having an inlet passage in the projecting portion and connecting one of said pair of chambers to the body chamber and an outlet passage connecting the body chamber with the other of said pair of chambers, said passages extending through the plug in substantial parallel relation and completely reversing the flow of fluid between the pair of chambers so as to return it to the said other chamber at a point adjacent its point of entry into the plug, the flexible diaphragm having a valve thereon to engage and close the end of the outlet passage; and a loading spring in the cover chamber for urging the valve into closed position and yielding upon increased pressure in the body chamber to permit the fluid to flow through the outlet passage and into its connected chamber.

8. A relief valve for connecting and controlling the fluid flow between a pair of chambers separated by a wall having an opening therein comprising a casing formed of a body portion and a cover portion secured together, a flexible fluid pressure operated diaphragm disposed between the body and cover portions and with them forming a body chamber and cover chamber, and a plug on said body portion having a neck on the end thereof projecting into and sealing the opening in the wall, said plug having a passage extending therethrough and through the neck and connecting one of said pair of chambers to the body chamber and another passage extending therethrough and connecting the body chamber with the other of said pair of chambers; and means including said diaphragm for controlling the passage of fluid from one of said pair of chambers to the other in response to the pressure in one of said pair of chambers.

9. A device of the type described comprising a casing divided by a wall into a pressure chamber and an exhaust chamber, said wall having an opening connecting the chambers, and means for controlling the flow of fluid through said opening from the pressure chamber to the exhaust chamber including a full mechanical relief valve unit having a plug secured to the wall of the exhaust chamber and including a part extending through the exhaust chamber and covering the opening in the dividing wall, said unit having passages in the plug extending from the opening to the exhaust chamber and a pressure actuated diaphragm valve controlling said passages and operated in response to abnormal pressure in the pressure chamber for connecting said pressure chamber to the exhaust chamber to relieve said abnormal pressure.

10. A device of the type described comprising a casing divided by a wall into a pressure chamber and an exhaust chamber, said wall having an opening connecting the chambers, and means for controlling the flow of fluid through said opening from the pressure chamber to the exhaust chamber including a full mechanical relief valve unit having a plug secured to the wall of the exhaust chamber and including a part extending through the exhaust chamber and covering the opening in the dividing wall, said unit having a pressure actuated diaphragm valve, a passage through the plug connecting the opening in the wall to one side of the diaphragm, and another passage through the plug from the diaphragm to the exhaust chamber, said latter passage being normally closed by the valve carried by the diaphragm and opened into communication with the first passage upon an abnormal pressure in the pressure chamber to relieve said pressure through the exhaust chamber.

FAIRCHILD WHITWORTH.